(12) United States Patent
Nishikawa et al.

(10) Patent No.: US 8,674,002 B2
(45) Date of Patent: Mar. 18, 2014

(54) VIBRATION-PROOF RUBBER COMPOSITION AND VIBRATION-PROOF RUBBER USING THE SAME

(75) Inventors: Yusuke Nishikawa, Komaki (JP); Norihito Kimura, Kasugai (JP)

(73) Assignee: Tokai Rubber Industries, Ltd., Komaki-shi, Aichi-ken (JP)

( * ) Notice: Subject to any disclaimer, the term of this patent is extended or adjusted under 35 U.S.C. 154(b) by 0 days.

(21) Appl. No.: 13/561,487

(22) Filed: Jul. 30, 2012

(65) Prior Publication Data

US 2012/0302692 A1    Nov. 29, 2012

Related U.S. Application Data

(63) Continuation of application No. PCT/JP2011/053409, filed on Feb. 17, 2011.

(30) Foreign Application Priority Data

Feb. 24, 2010   (JP) ................. 2010-039432

(51) Int. Cl.
   *C08K 9/00*     (2006.01)
   *C08K 3/34*     (2006.01)
(52) U.S. Cl.
   USPC ............................ 523/216; 524/492; 524/493
(58) Field of Classification Search
   USPC .................... 523/216; 524/492, 493
   See application file for complete search history.

(56) References Cited

U.S. PATENT DOCUMENTS

| | | | | |
|---|---|---|---|---|
| 4,322,319 A * | 3/1982 | Ikeda et al. | ................... | 525/194 |
| 5,080,332 A * | 1/1992 | Yoda et al. | ................ | 267/140.12 |
| 6,344,518 B1 * | 2/2002 | Kobayashi et al. | ............ | 524/862 |
| 6,465,581 B1 * | 10/2002 | Wideman et al. | ............ | 525/332.7 |
| 2005/0187332 A1 * | 8/2005 | Minagawa et al. | ............ | 524/492 |
| 2007/0015861 A1 | 1/2007 | Minagawa et al. | | |
| 2009/0143538 A1 | 6/2009 | Nomura et al. | | |

FOREIGN PATENT DOCUMENTS

| | | | |
|---|---|---|---|
| JP | 11-193338 | A | 7/1999 |
| JP | 11-255964 | A | 9/1999 |
| JP | 2001-164051 | A | 6/2001 |
| JP | 2002-003652 | A | 1/2002 |
| JP | 2004-108932 | A | 4/2004 |
| JP | 2006-052105 | A | 2/2006 |
| JP | 2006-337342 | A | 12/2006 |
| JP | 2007-23155 | A | 2/2007 |
| JP | 2007-217562 | A | 8/2007 |
| JP | 2009-215338 | A | 9/2009 |
| JP | 2009-256580 | A | 11/2009 |
| JP | 2010-59271 | A | 3/2010 |
| JP | 2010-216952 | A | 9/2010 |

OTHER PUBLICATIONS

International Search Report of PCT/JP2011/053409, mailing date of May 17, 2011.
Supplementary European Search Report dated Aug. 15, 2013, issued in corresponding European Patent Application No. 11747248 (3 pages).
Japanese Office Action dated Nov. 5, 2013, issued in corresponding Japanese Patent Application No. 2012-501757, w/ partial English translation.

* cited by examiner

*Primary Examiner* — Hannah Pak
(74) *Attorney, Agent, or Firm* — Westerman, Hattori, Daniels & Adrian, LLP

(57) ABSTRACT

A vibration-proof rubber composition excellent in both characteristics of durability and compression set characteristic is provided. A vibration-proof rubber composition includes components (A) to (C) below, wherein an amount of reacted silane coupling agent in the component (B) is 6.5% by weight or more, and an amount of unreacted silane coupling agent is in a range of 0.5 to 2.5% by weight: (A) diene rubber; (B) pre-treated silica prepared by surface-treating, with a silane coupling agent, silica having a BET specific surface area in a range of 180 to 230 $m^2/g$; and (C) sulfur.

10 Claims, No Drawings

VIBRATION-PROOF RUBBER COMPOSITION AND VIBRATION-PROOF RUBBER USING THE SAME

TECHNICAL FIELD

The present invention relates to a vibration-proof rubber composition and vibration-proof rubber using the same, and specifically relates to a vibration-proof rubber composition used for vehicle suspension parts and the like and to vibration-proof rubber using the composition.

BACKGROUND OF THE INVENTION

Vibration-proof rubber has been widely used in various fields in which the vibration-proof rubber is interposed between two members constituting a vibration transmission system to establish vibration-proof connection between the two members, and, for example, in the automobile field, the vibration-proof rubber has been used as an engine mount, a body mount, a member mount, a suspension bush, and the like.

As a vibration-proof rubber composition used for the vibration-proof rubber, in general, a composition containing diene rubber, silica small particles, and a silane coupling agent has been used (Japanese Unexamined Patent Application Publication No. 11-255964). However, kneading of the silica small particles and the silane coupling agent with rubber increases the viscosity in an unvulcanized state due to re-aggregation of silica, thereby degrading compression set and storage stability.

Therefore, in order to improve this degradation, pre-treated silica prepared by surface-treating silica with a silane coupling agent has recently been used. Examples proposed as a rubber composition using the pre-treated silica include a rubber composition for an engine mount containing at least one type of diene rubber as a main rubber component and silica fine particles which are previously surface-treated with a silane coupling agent and which have a BET specific surface area of 40 to 170 $m^2/g$ (Japanese Unexamined Patent Application Publication No. 11-193338), a rubber composition containing 100 parts by weight of a rubber component containing at least one type of diene rubber, 20 to 120 parts by weight of silica pre-treated with 2 to 15% by weight of a silane coupling agent, and 2 to 10% by weight of alkoxysilane of silica before being pre-treated (Japanese Unexamined Patent Application Publication No. 2002-3652), and the like.

SUMMARY OF THE INVENTION

However, the use of pre-treated silica as described in Japanese Unexamined Patent Application Publication No. 11-193338 and Japanese Unexamined Patent Application Publication No. 2002-3652 has the problem of producing variation in physical properties of the pre-treated silica because of unstable reaction (chemical bonding) between the silica and the silane coupling agent. Therefore, vibration-proof rubber compositions using the pre-treated silica are poor in durability, compression set characteristic, etc.

A vibration-proof rubber composition is provided which is excellent in both characteristics of durability and compression set, and provide vibration-proof rubber using the composition.

Solution to Problem

A first feature lies in a vibration-proof rubber composition containing components (A) to (C) below, wherein an amount of reacted silane coupling agent in the component (B) is 6.5% by weight or more, and an amount of unreacted silane coupling agent is in a range of 0.5 to 2.5% by weight:

(A) diene rubber;
(B) pre-treated silica prepared by surface-treating, with a silane coupling agent, silica having a BET specific surface area in a range of 180 to 230 $m^2/g$; and
(C) sulfur.

A second feature lies in vibration-proof rubber using the vibration-proof rubber composition.

It is technical common knowledge about conventional pre-treated silica that an unreacted silane coupling agent after surface treatment is considered to adversely affect the characteristics of rubber, and thus from the viewpoint of safety etc., the unreacted silane coupling agent not bonded to silica is removed by a washing work with alcohol, acetone, or the like after the surface treatment. Contrary to the technical common knowledge, when pre-treated silica containing an unreacted silane coupling agent intentionally left without washing with alcohol or the like after surface treatment is used, the durability of vibration-proof rubber is improved. That is, when the amount of the reacted silane coupling agent is set to 6.5% by weight or more, durability is improved, and when the amount of the unreacted silane coupling agent is set in a range of 0.5 to 2.5% by weight, durability is further improved, and compression set characteristic can also be satisfied.

The term "reacted amount" refers to the amount (% by weight) of the silane coupling agent chemically bonded to silica by surface treatment, and the term "unreacted amount" refers to the amount (% by weight) of the silane coupling agent not chemically bonded to silica.

The reacted amount and the unreacted amount can be measured by, for example, a differential thermal analyzer (TG-DTA).

As described above, the vibration-proof rubber composition contains the diene rubber, the pre-treated silica prepared by surface-treating silica having a BET specific surface area in the range of 180 to 230 $m^2/g$ with the silane coupling agent, and sulfur. In addition, durability is improved by setting the amount of the reacted silane coupling agent in the pre-treated silica to 6.5% by weight or more, and compression set characteristic can also be satisfied by setting the amount of the unreacted silane coupling agent in the range of 0.5 to 2.5% by weight. Since the pre-treated silica is used, re-aggregation of silica can be suppressed, and deterioration in storage stability due to an increase in viscosity of unvulcanized rubber can be improved. Further, since silica used as the pre-treated silica is small-size silica having a BET specific surface area in the range of 180 to 230 $m^2/g$, workability is also improved.

In addition, when the amount of the pre-treated silica mixed as the component (B) is in the range of 20 to 60 parts by weight relative to 100 parts by weight of the diene rubber as the component (A), a balance between durability and compression set characteristic is improved.

When the amount of the silane coupling agent charged is in the range of 8 to 18% by weight relative to 100% by weight of silica before surface treatment, a balance between durability and compression set characteristic is improved.

When the pre-treated silica as the component (B) is not washed, a conventional washing step with an alcohol or the like after surface treatment can be omitted, thereby resulting in reduction in cost.

When the amount of sulfur mixed as the component (C) is 1.5 parts by weight or more relative to 100 parts by weight of the diene rubber as the component (A), use for application which requires not so high heat resistance (e.g., a vehicle suspension part and the like) can be realized.

DETAILED DESCRIPTION OF THE INVENTION

An embodiment of the present invention is described in detail below. However, the present invention is not limited to this embodiment.

A vibration-proof rubber composition can be produced using diene rubber (component A), specific pre-treated silica (component B), and sulfur (component C).

The amount of the reacted silane coupling agent in the specific pre-treated silica (component B) is set to 6.5% by weight or more, and the amount of the unreacted silane coupling agent is set in the range of 0.5 to 2.5% by weight (hereinafter may be simply abbreviated as "%").

<<Diene Rubber (Component A)>>

Examples of the diene rubber (component A) include natural rubber (NR), isoprene rubber (IR), butadiene rubber (BR), styrene-butadiene rubber (SBR), acrylonitrile-butadiene rubber (NBR), butyl rubber (IIR), and the like. These may be used alone or in combination or two or more. Among these, the natural rubber is preferred in view of durability.

<<Specific Pre-Treated Silica (Component B)>>

The specific pre-treated silica (component B) is prepared by surface-treating, with a silane coupling agent (surface treatment agent), silica having a BET specific surface area in the range of 180 to 230 $m^2/g$.

The BET specific surface area of silica before the surface treatment is in the range of 180 to 230 $m^2/g$. This is because with an excessively small BET specific surface area, durability is worsened due to an excessively large particle diameter, while, conversely, with an excessively large BET specific surface area, dispersion in the diene rubber (component A) becomes difficult due to an excessively small particle diameter, thereby degrading workability. The BET specific surface area can be measured, for example, according to ISO 5794/1.

As the silica, for example, crystalline silica, amorphous silica, and the like can be used. In addition, the silica used preferably has an average particle diameter (secondary particle diameter) in the range of 5 to 30 μm. The average particle diameter of the silica can be measured by, for example, using a laser diffraction scattering particle size distribution analyzer.

As described above, in the specific pre-treated silica (component B), the amount of the reacted silane coupling agent is set to 6.5% or more, and the amount of the unreacted silane coupling agent is set in the range of 0.5 to 2.5%.

The reacted amount and the unreacted amount can be measured, for example, using a differential thermal analyzer (TG-DTA). A thermogravimetric analyzer (TG) is an apparatus which continuously detects and records weight changes produced by changing the temperature of a sample, and a differential thermal analyzer (DTA) is an apparatus which measures a temperature difference between a sample and a reference material as a temperature function so that a weight change can be measured by using TG and DTA in combination.

A method for calculating the reacted amount is specifically described. First, the weight of each of the silica component and the silane coupling agent is calculated based on measurement of the pre-treated silica (component B) with the differential thermal analyzer (TG-DTA). Next, the unreacted silane coupling agent in the pre-treated silica (component B) is washed out with alcohol or acetone and then subjected to measurement with the differential thermal analyzer (TG-DTA). Then, the reacted amount is calculated from a weight difference of the silane coupling agent before and after washing.

<Reacted Amount>

The reacted amount in the specific pre-treated silica (component B) is 6.5% or more and preferably 7.5% or more. This is because an excessively small reacted amount causes deterioration in durability.

<Unreacted Amount>

The unreacted amount in the specific pre-treated silica (component B) is set in the range of 0.5 to 2.5% and preferably in the range of 0.8 to 1.5%. This is because an excessively small unreacted amount causes deterioration in durability, and conversely an excessively large unreacted amount causes deterioration in compression set characteristic.

The total of the reacted amount and the unreacted amount is preferably in the range of 7.8 to 10.0%.

In addition, the ratio by weight of the reacted amount to the unreacted amount is preferably in the range of reacted amount/unreacted amount=5/1 to 10/1.

The specific pre-treated silica (component B) can be prepared by adjusting the amount of the silane coupling agent (surface treatment agent) charged, the reaction time, the reaction temperature etc.

The specific pre-treated silica (component B) can be prepared, for example, as follows. Silica having a BET specific surface area in the range of 180 to 230 $m^2/g$ is mixed with a predetermined amount of the silane coupling agent.

More specifically, the amount of the silane coupling agent charged is preferably in the range of 8 to 18% and particularly preferably in the range of 11 to 15% relative to 100% of silica before surface treatment.

Examples of the silane coupling agent include bis(3-triethoxysilylpropyl)tetrasulfane, thiocyanatopropyl triethoxysilane, γ-mercaptopropyl trimethoxysilane, and the like. These may be used alone or in combination of two or more.

In an application which requires high heat resistance (for example, an engine mount and the like), the silane coupling agent containing few sulfur (S) atoms (for example, 0 or 1 S atom) in its molecule is used, while in an application which requires not so high heat resistance (for example, a vehicle suspension part and the like), the silane coupling agent containing many sulfur (S) atoms (for example, 2 or more S atoms) in its molecule can be used.

The amount of sulfur (S) atoms in the pre-treated silica (component B) surface-treated with the silane coupling agent can be determined by, for example, elemental analysis of the surfaces of the silica using TEM-EELS including a transmission electron microscope (TEM) in combination with electron energy loss spectroscopy (EELS).

As the conditions of the surface treatment, the temperature is preferably in the range of 80° C. to 120° C. and particularly preferably in the range of 100° C. to 120° C., and the reaction time is preferably in the range of 15 to 60 minutes and particularly preferably in the range of 15 to 30 minutes.

The amount of the thus-produced specific pre-treated silica (component B) mixed is preferably in the range of 20 to 60 parts and particularly preferably in the range of 25 to 45 parts relative to 100 parts by weight (hereinafter abbreviated as "parts") of the diene rubber. This is because with an excessively small amount of the component B mixed, durability is degraded due to insufficient reinforcement, and conversely, with an excessively large amount of the component B mixed, workability is degraded due to an increase in viscosity of unvulcanized rubber.

<<Sulfur (Component C)>>

The amount of the sulfur (component C) mixed depends on the presence of heat resistance in the vibration-proof rubber composition. For example, in an application which requires not so high heat resistance (for example, a vehicle suspension part and the like), the amount of the sulfur (component C) mixed is preferably in the range of 1.5 parts or more, particularly preferably in the range of 1.5 to 4.0 parts, and most preferably in the range of 2.0 to 3.0 parts relative to 100 parts of the diene rubber.

On the other hand, in an application which requires high heat resistance (for example, an engine mount and the like), the amount of the sulfur (component C) mixed is preferably in the range of less than 1.5 parts, particularly preferably in the range of 1.0 part or less, and most preferably in the range of 0.7 parts or less relative to 100 parts of the diene rubber.

Besides the above-described components A to C, if required, the vibration-proof rubber composition may be appropriately mixed with a vulcanization accelerator, a vulcanization aid, an age resister, process oil, carbon black, a processing aid, etc. These can be used alone or in combination of two or more.

<<Vulcanization Accelerator>>

Examples of the vulcanization accelerator include thiazole, sulfenamide, thiuram, aldehydeammonia, aldehydeamine, guanidine, and thiourea vulcanization accelerators, and the like. These can be used alone or in combination of two or more. Among these, the sulfenamide vulcanization accelerators are preferred from the viewpoint of excellent vulcanization reactivity.

The amount of the vulcanization accelerator mixed is preferably in the range of 0.1 to 10 parts and particularly preferably in the range of 0.5 to 3 parts relative to 100 parts of the diene rubber (component A).

Examples of the thiazole vulcanization accelerators include dibenzothiazyl disulfide (MBTS), 2-mercaptobenzothiazole (MBT), 2-mercaptobenzothiazole sodium salt (NaMBT), 2-mercaptobenzothiazole zinc salt (ZnMBT), and the like. These can be used alone or in combination of two or more. Among these, dibenzothiazyl disulfide (MBTS) and 2-mercaptobenzothiazole (MBT) are preferred from the viewpoint of excellent vulcanization reactivity.

Examples of the sulfenamide vulcanization accelerators include N-oxydiethylene-2-benzothiazolyl sulfenamide (NOBS), N-cyclohexyl-2-benzothiazolyl sulfenamide (CBS), N-tert-butyl-2-benzothiazoyl sulfenamide (BBS), N,N'-dicyclohexyl-2-benzothiazoyl sulfenamide, and the like. These can be used alone or in combination of two or more.

Examples of the thiuram vulcanization accelerators include tetramethylthiuram disulfide (TMTD), tetraethylthiuram disulfide (TETD), tetrabutylthiuram disulfide (TBTD), tetrakis(2-ethylhexyl)thiuram disulfide (TOT), tetrabenzylthiuram disulfide (TBzTD), and the like. These can be used alone or in combination of two or more.

<<Vulcanization Aid>>

Examples of the vulcanization aid include zinc oxide (ZnO), stearic acid, magnesium oxide, and the like. These can be used alone or in combination of two or more.

The amount of the vulcanization aid mixed is preferably in the range of 1 to 25 parts and particularly preferably in the range of 3 to 10 parts relative to 100 parts of the diene rubber (component A).

<<Age Resister>>

Examples of the age resister include carbamate age resisters, phenylenediamine age resisters, phenol age resisters, diphenylamine age resisters, quinoline age resisters, imidazole age resisters, waxes, and the like. These can be used alone or in combination of two or more.

The amount of the age resister mixed is preferably in the range of 1 to 10 parts and particularly preferably in the range of 2 to 5 parts relative to 100 parts of the diene rubber (component A).

<<Process Oil>>

Examples of the process oil include naphthenic oil, paraffin oil, aromatic oil, and the like. These can be used alone or in combination of two or more.

The amount of the process oil mixed is preferably in the range of 1 to 50 parts and particularly preferably in the range of 3 to 30 parts relative to 100 parts of the diene rubber (component A).

<<Carbon Black>>

Examples of the carbon black include various grades of carbon black such as SAF grade, ISAF grade, HAF grade, MAF grade, FEF grade, GPF grade, SRF grade, FT grade, MT grade, and the like. These can be used alone or in combination of two or more.

The amount of the carbon black mixed is preferably in the range of 1 to 80 parts and particularly preferably in the range of 1 to 30 parts relative to 100 parts of the diene rubber in view of kneadability.

<<Processing Aid>>

Examples of the processing aid include those based on fatty acids, fatty acid metal salts, fatty acid esters, and the like. These can be used alone or in combination of two or more.

The amount of the processing aid mixed is preferably in the range of 0.5 to 10 parts and particularly preferably in the range of 1 to 5 parts relative to 100 parts of the diene rubber (component A).

The vibration-proof rubber composition can be prepared, for example, as follows. The diene rubber (component A) and the specific pre-treated silica (component B), and if required, the vulcanization aid, the age resister, the process oil, etc. are appropriately mixed, and the resultant mixture is kneaded with a Banbury mixer at a temperature of about 50° C. at the start and at 100 to 160° C. for about 3 to 5 minutes. The mixture is then mixed with sulfur (component C), the vulcanization accelerator, etc. and then kneaded with an open roll under predetermined conditions (for example, 50° C.×4 minutes) to prepare the vibration-proof rubber composition. Then, the resultant vibration-proof rubber composition can be vulcanized at a high temperature (150 to 170° C.) for 5 to 30 minutes to produce vibration-proof rubber.

The vibration-proof rubber composition generally has the following vulcanizate properties.

[Compression Set]

The vibration-proof rubber composition is pressed, vulcanized, and molded at 160° C. for 30 minutes to form a test piece. Then, according to JIS J6262, a compression set (%) of the test piece is measured after the test piece is 25% compressed at 85° C. for 72 hours.

The compression set is preferably 45% or less and particularly preferably 40% or less.

EXAMPLES

Next, examples are described together with comparative examples. However, the present invention is not limited to these examples.

Prior to the examples and comparative examples, materials described below were prepared.

[Diene Rubber (Component A)]

Natural Rubber (RSS#3)

[Pre-Treated Silica (Component B)]
<Pre-Treated Silica A to E (for Examples) and Pre-Treated Silica b and c (for Comparative Examples)>

Each pre-treated silica was prepared as follows. Silica (VN3 manufactured by Tosoh Silica Corporation, BET specific surface area: 180 to 230 m$^2$/g) was surface-treated with a silane coupling agent (Si69 manufactured by Evonik Deguusa Co., Ltd.) to prepare pre-treated silica in which the reacted amount and unreacted amount of the silane coupling agent were controlled.

The amount (%) of the silane coupling agent charged, pretreatment temperature (° C.), and pretreatment time (min) of each silica, and the reacted amount (%) and unreacted amount (%) of the silane coupling agent are as shown in Tables 1 and 2 below.

The reacted amount and unreacted amount of the silane coupling agent were measured with a differential thermal analyzer (TG-DTA) (manufactured by SII Nano Technology Inc.) in a nitrogen atmosphere under conditions including a temperature of RT (20° C.) to 600° C. (20° C./min) and a sample amount of about 5 mg.

<Pre-Treated Silica a (for Comparative Examples)>
Capuseal 8113 manufactured by Evonik Deguusa Co., Ltd.

[Silica]
VN3 (BET specific surface area: 180 to 230 m$^2$/g) manufactured by Tosoh Silica Corporation

[Silane Coupling Agent]
Si69 manufactured by Evonik Deguusa Co., Ltd.

[Zinc Oxide]
Zinc oxide type II manufactured by Sakai Chemical Industry Co., Ltd.

[Stearic Acid]
Lunac S30 manufactured by Kao Corporation

[Age Resister]
Nocrac 6C manufactured by Ouchi Shinko Chemical Co., Ltd.

[Wax]
Sunnoc manufactured by Ouchi Shinko Chemical Co., Ltd.

[Naphthenic Oil]
Fukkol Flex #1150 manufactured by Fuji Kosan Co., Ltd.

[Vulcanization Accelerator]
Nocceler CZ-G manufactured by Ouchi Shinko Chemical Co., Ltd.

[Sulfur (Component C)]
Sulfur (vulcanizing agent) (powdery sulfur manufactured by Tsurumi Chemical Co., Ltd.)

Example 1

As shown in Table 1 below, 100 parts of natural rubber as diene rubber (component A), 35 parts of pre-treated silica A, 5 parts of zinc oxide, 1 part of stearic acid, 3 parts by age resister, 2 parts of wax, and 5 parts of naphthenic oil were mixed, and the resultant mixture was kneaded using a Banbury mixer at a temperature of about 50° C. at the start and at the maximum temperature (150° C.) for 4 minutes. Then, 1 part of vulcanization accelerator and 2.5 parts of sulfur (vulcanizing agent) were added to the mixture, and the resultant mixture was kneaded with an open roll at about 50° C. for 4 minutes to prepare a rubber composition.

Examples 2 to 7 and Comparative Examples 1 to 4

Rubber compositions were prepared by the same method as in Example 1 except that the type and mixing ratio of each component were changed as shown in Tables 1 and 2 below.

TABLE 1

| | Example (parts by weight) | | | | | | |
|---|---|---|---|---|---|---|---|
| | 1 | 2 | 3 | 4 | 5 | 6 | 7 |
| Natural rubber | 100 | 100 | 100 | 100 | 100 | 100 | 100 |
| Pre-treated silica | 35 | 35 | 35 | 35 | 35 | 20 | 60 |
| (type) | A | B | C | D | E | B | B |
| Zinc oxide | 5 | 5 | 5 | 5 | 5 | 5 | 5 |
| Stearic acid | 1 | 1 | 1 | 1 | 1 | 1 | 1 |
| Age resister | 3 | 3 | 3 | 3 | 3 | 3 | 3 |
| Wax | 2 | 2 | 2 | 2 | 2 | 2 | 2 |
| Naphthenic oil | 5 | 5 | 5 | 5 | 5 | 5 | 5 |
| Vulcanization accelerator | 1 | 1 | 1 | 1 | 1 | 1 | 1 |
| Sulfur | 2.5 | 2.5 | 2.5 | 2.5 | 2.5 | 2.5 | 2.5 |
| Amount of silane coupling agent charged (%) | 13 | 13 | 8 | 18 | 13 | 13 | 13 |
| Pretreatment temperature (° C.) | 120 | 120 | 120 | 120 | 100 | 120 | 120 |
| Pretreatment time (min) | 15 | 30 | 30 | 30 | 15 | 30 | 30 |
| Reacted amount (%) | 6.7 | 7.6 | 6.6 | 8.1 | 6.5 | 7.6 | 7.6 |
| Unreacted amount (%) | 1.5 | 1.1 | 0.5 | 2.5 | 1.7 | 1.1 | 1.1 |
| Compression set (%) | 40 | 37 | 33 | 44 | 41 | 36 | 38 |
| (evaluation) | good | good | good | good | good | good | good |
| Static stiffness (N/mm) | 453 | 524 | 451 | 534 | 448 | 373 | 712 |
| Durability | 34 | 42 | 35 | 45 | 36 | 61 | 11 |
| evaluation | good | good | good | good | good | good | good |

TABLE 2

| | Comparative Example (parts by weight) | | | |
|---|---|---|---|---|
| | 1 | 2 | 3 | 4 |
| Natural rubber | 100 | 100 | 100 | 100 |
| Pre-treated silica | 35 | 35 | 35 | — |
| (type) | a | b | c | |
| Silica | — | — | — | 30.45 |
| Silane coupling agent | — | — | — | 4.55 |
| Zinc oxide | 5 | 5 | 5 | 5 |
| Stearic acid | 1 | 1 | 1 | 1 |
| Age resister | 3 | 3 | 3 | 3 |
| Wax | 2 | 2 | 2 | 2 |
| Aromatic oil | 5 | 5 | 5 | 5 |
| Vulcanization accelerator | 1 | 1 | 1 | 1 |
| Sulfur | 2.5 | 2.5 | 2.5 | 2.5 |
| Amount of silane coupling agent charged (%) | 13 | 13 | 20 | — |
| Pretreatment temperature (° C.) | Commercial product | 80 | 120 | — |
| Pretreatment time (min) | | 15 | 15 | — |
| Reacted amount (%) | 7.0 | 5.8 | 7.0 | — |
| Unreacted amount (%) | 0.1 | 2.2 | 3.2 | — |
| Compression set (%) | 33 | 43 | 47 | 50 |
| (evaluation) | good | good | poor | poor |
| Static stiffness (N/mm) | 468 | 381 | 504 | 500 |
| Durability | 31 | 24 | 37 | 40 |
| evaluation | poor | poor | good | good |

Each of the thus-prepared rubber compositions of Examples and Comparative Examples was evaluated with respect to each of the characteristics according to criteria described below. The results are also shown in Tables 1 and 2.

[Compression Set]
Each of the rubber compositions was pressed, vulcanized, and molded at 160° C. for 30 minutes to form a test piece.

Then, according to JIS K6262, a compression set (%) of the test piece was measured after the test piece was 25% compressed at 85° C. for 72 hours.

A compression set of 45 or less was evaluated as "good", and a compression set of over 45 was evaluated as "poor".

[Durability Evaluation]

Each of the rubber compositions was pressed and vulcanized at 150° C. for 20 minutes to form a rubber test piece of 120 mm×120 mm×thickness 2 mm. The rubber test piece was punched into a JIS No. 3 dumbbell and then repeatedly subjected to an elongation of 0 to 100% until breakage occurred to evaluate durability.

With respect to durability, a value exceeding value (X) represented by a numerical expression (1) described below was evaluated as "good", and a value equal to or smaller than the value (X) represented by the numerical expression (1) was evaluated as "poor".

In the numerical expression (1), static stiffness (Ks) was measured as described below.

<Static Stiffness (Ks)>

Disk-shaped fittings (diameter 60 mm, thickness 6 mm) were pressed, vulcanized, and bonded to the upper and lower surfaces of a rubber piece (diameter 50 mm, height 25 mm) using each of the rubber compositions under vulcanization conditions of 170° C. and 30 minutes to form a test piece. The test piece was compressed by 7 mm in the cylinder axial direction, and static stiffness (Ks) (N/mm) was calculated based on a load at a deflection of each of 1.5 mm and 3.5 mm which was read from a second forward load-deflection curve.

[Math. 1]

$$X = 3.4E{+}06 e^{-5.1E{-}03 \times Ks} \qquad (1)$$

[wherein Ks represents static stiffness]

According to the results shown in Tables 1 and 2, the products of the examples use the pre-treated silica in which the reacted amount and unreacted amount are adjusted in the respective specified ranges, and thus both the durability and compression set can be satisfied.

In contrast, the product of Comparative Example 1 uses the pre-treated silica a having an excessively small unreacted amount and thus has poor durability.

The product of Comparative Example 2 uses the pre-treated silica b having an excessively small reacted amount and thus has poor durability.

The product of Comparative Example 3 uses the pre-treated silica c having an excessively large unreacted amount and thus has a poor compression set characteristic.

The product of Comparative Example 4 simply uses the silane coupling agent and silica which is usual silica not pre-treated with the silane coupling agent, and thus has a poor compression set characteristic.

Although, in the above-described examples, specific modes of the present invention are described, the examples are only exemplary and are not limitedly interpreted. In addition, the scope of the present invention includes all modifications within a scope equivalent to the claims.

A vibration-proof rubber composition can be used in application (for example, vehicle suspension parts, a side-engine mount, a member mount, etc.) which requires not so high heat resistance, and other applications (for example, an engine mount, a torque rod, etc.) which require high heat resistance.

The invention claimed is:

1. A vibration-proof rubber composition, comprising:
   diene rubber;
   surface-treated silica, comprising at least 6.5% by weight of a reacted silane coupling agent, and 0.5 to 2.5% by weight of an unreacted silane coupling agent, wherein a silica before surface treatment has a BET specific surface area in a range of 180 to 230 m²/g; and
   sulfur.

2. The vibration-proof rubber composition according to claim 1, wherein an amount of the surface-treated silica is in a range of 20 to 60 parts by weight relative to 100 parts by weight of the diene rubber.

3. The vibration-proof rubber composition according to claim 2, wherein an amount of a silane coupling agent charged to the silica before surface treatment is in a range of 8 to 18% by weight relative to 100% by weight of the silica.

4. The vibration-proof rubber composition according to claim 3, wherein the surface-treated silica is not washed.

5. The vibration-proof rubber composition according to claim 4, wherein an amount of the sulfur is at least 1.5 parts by weight relative to 100 parts by weight of the diene rubber.

6. A vibration-proof vehicle suspension part comprising the vibration-proof rubber composition according to claim 1.

7. A vibration-proof vehicle suspension part comprising the vibration-proof rubber composition according to claim 2.

8. A vibration-proof vehicle suspension part comprising the vibration-proof rubber composition according to claim 3.

9. A vibration-proof vehicle suspension part comprising the vibration-proof rubber composition according to claim 4.

10. A vibration-proof vehicle suspension part comprising the vibration-proof rubber composition according to claim 5.

* * * * *